(12) United States Patent
Cheng et al.

(10) Patent No.: US 10,536,239 B2
(45) Date of Patent: Jan. 14, 2020

(54) SOFT CHANNEL TRACKING USING DETECTION OUTPUT

(71) Applicant: Samsung Electronics Co., Ltd., Gyeonggi-do (KR)

(72) Inventors: Hongbing Cheng, San Diego, CA (US); Ruchen Duan, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/447,899

(22) Filed: Mar. 2, 2017

(65) Prior Publication Data

US 2018/0167123 A1    Jun. 14, 2018

Related U.S. Application Data

(60) Provisional application No. 62/434,077, filed on Dec. 14, 2016.

(51) Int. Cl.
| | |
|---|---|
| *H04B 7/06* | (2006.01) |
| *H04L 1/00* | (2006.01) |
| *H04L 5/00* | (2006.01) |
| *H04L 25/02* | (2006.01) |
| *H04L 25/06* | (2006.01) |

(52) U.S. Cl.
CPC ............ *H04L 1/0054* (2013.01); *H04L 5/006* (2013.01); *H04L 25/024* (2013.01); *H04L 25/0224* (2013.01); *H04L 25/067* (2013.01)

(58) Field of Classification Search
CPC .............. H04W 72/1247; H04W 72/10; H04L 25/067; H04L 25/024
See application file for complete search history.

(56) References Cited

U.S. PATENT DOCUMENTS

| | | |
|---|---|---|
| 8,116,242 B2 | 2/2012 | Thomas et al. |
| 8,693,588 B2 | 4/2014 | McCloud et al. |
| 8,750,359 B2 | 6/2014 | Medles et al. |
| 8,811,545 B2 | 8/2014 | Annavajjala et al. |
| 8,989,320 B2 | 3/2015 | Salvekar et al. |
| 9,118,446 B2 | 8/2015 | Hu et al. |
| 9,374,175 B2 | 6/2016 | Beckman |

(Continued)

OTHER PUBLICATIONS

3GPP TSG-RAN WG4 Meeting #66bis, Chicago, USA, Apr. 15-19, 2013 Receiver structure feasibility for LTE Rel-12, p. 9.

*Primary Examiner* — Khaled M Kassim
*Assistant Examiner* — Syed Ali
(74) *Attorney, Agent, or Firm* — The Farrell Law Firm, P.C.

(57) ABSTRACT

A method and apparatus are provided. The method includes receiving, by a user equipment (UE), a first signal from a transceiver, determining one of a probability and a soft mean with a soft variance associated with the detected data symbol, determining a first coefficient and a second coefficient based on the determined one of the probability and the soft mean with the soft variance associated with the detected data symbol, determining channel state information (CSI) on a channel between the transceiver and the UE based on a second signal received by the UE from the transceiver, a previous CSI, the first coefficient and the second coefficient, and tracking the communication channel based on the determined CSI.

12 Claims, 6 Drawing Sheets

(56) References Cited

U.S. PATENT DOCUMENTS

| | | | |
|---|---|---|---|
| 2008/0225976 A1* | 9/2008 | Prasad | H04B 7/0413 375/267 |
| 2009/0103666 A1* | 4/2009 | Zhao | H04L 25/022 375/341 |
| 2014/0204991 A1* | 7/2014 | Huang | H03M 13/2957 375/232 |
| 2014/0369300 A1 | 12/2014 | Hu et al. | |
| 2016/0080174 A1 | 3/2016 | Choi et al. | |
| 2016/0105257 A1 | 4/2016 | Jiao et al. | |
| 2016/0142180 A1 | 5/2016 | Caretti et al. | |
| 2016/0249234 A1 | 8/2016 | Zhang et al. | |
| 2016/0352419 A1* | 12/2016 | Fonseka | H04B 10/0793 |
| 2017/0012687 A1* | 1/2017 | Sawahashi | H04B 7/0456 |
| 2017/0070377 A1* | 3/2017 | Sawahashi | H04L 27/2602 |
| 2017/0346580 A1* | 11/2017 | Astrom | H04L 25/0202 |

\* cited by examiner

SOFT CHANNEL TRACKING USING DETECTION OUTPUT

PRIORITY

This application claims priority under 35 U.S.C. § 119(e) to U.S. Provisional Patent Application No. 62/434,077 which was filed in the U.S. Patent and Trademark Office on Dec. 14, 2016, the entire content of which is incorporated herein by reference.

FIELD

The present disclosure generally relates to wireless communication systems, and more particularly, to a method and apparatus for soft channel tracking using detection output.

BACKGROUND

In a wireless communication system, channel state information (CSI) refers to known channel properties of a communication link between a transmitter and a receiver. The CSI describes how a wireless signal propagates from the transmitter to the receiver and represents the combined effect of multipath scattering, fading, and power decay with distance. The CSI may be determined through a method of channel estimation. The CSI assists in adapting communication to current channel conditions, which is important for achieving reliable communication with high data rates, particularly in multi-antenna and OFDM systems. The method of determining CSI is important for proper symbol detection in a receiver within a modem chipset. Since the channel is time varying, the CSI needs to be provided for each symbol in a transmitted frame. The accuracy of the channel estimation significantly influences the performance of the receiver.

In a wireless communication system such as wireless fidelity (WiFi), the channel may not vary over time or vary slowly due to the low mobility of the devices connected to the system. In the IEEE 802.11 specifications (such as IEEE 802.11n and IEEE 802.11ac), the initial channel estimation which generates CSI is obtained using long-training field (LTF) symbols. The initial channel estimation may be used to demodulate the data symbols transmitted after the LTF symbols. For each of the data symbols transmitted in the frame after the LTF, symbol detection is performed using the CSI from the previously detected data symbol, and the previously detected data symbols are re-used to estimate the channel which refines the channel estimation obtained initially using the LTF. The noise is averaged, and the channel is tracked due to time varying channel conditions. This process used to re-estimate the channel and to update the CSI accordingly is referred to as channel tracking. The channel tracking may be performed across the entire frame for each symbol in an iterative fashion.

SUMMARY

According to an aspect of the present disclosure, a method is provided which includes receiving, by a user equipment (UE), a first signal from a transceiver, detecting a data symbol within the first signal, determining one of a probability and a soft mean with a soft variance associated with the detected data symbol, determining a first coefficient and a second coefficient based on the determined one of the probability and the soft mean with the soft variance associated with the detected data symbol, determining channel state information (CSI) on a channel between the transceiver and the UE based on a second signal received by the UE from the transceiver, a previous CSI, the first coefficient and the second coefficient, and tracking the communication channel based on the determined CSI.

According to another aspect of the present disclosure, an apparatus is provided which includes a memory, a processor, and a receiver configured to receive a first signal from a transceiver, detect a data symbol within the first signal, determine one of a probability and a soft mean with a soft variance associated with the detected data symbol, determine a first coefficient and a second coefficient based on the determined one of the probability and the soft mean with the soft variance associated with the detected data symbol, determine channel state information (CSI) on a channel between the transceiver and the receiver based on a second signal received from the transceiver, a previous CSI, the first coefficient and the second coefficient, and track the communication channel based on the determined CSI.

According to another aspect of the present disclosure, a method of manufacturing a processor is provided which includes forming the processor as part of a wafer or a package that includes at least one other processor, wherein the processor is configured to receive a first signal from a transceiver, detect a data symbol within the first signal, determine one of a probability and a soft mean with a soft variance associated with the detected data symbol, determine a first coefficient and a second coefficient based on the determined one of the probability and the soft mean with the soft variance associated with the detected data symbol, determine channel state information (CSI) on a channel between the transceiver and a receiver based on a second signal received from the transceiver, a previous CSI, the first coefficient and the second coefficient, and track the communication channel based on the determined CSI.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured to receive a first signal from a transceiver, detect a data symbol within the first signal, determine one of a probability and a soft mean with a soft variance associated with the detected data symbol, determine a first coefficient and a second coefficient based on the determined one of the probability and the soft mean with the soft variance associated with the detected data symbol, determine channel state information (CSI) on a channel between the transceiver and a receiver based on a second signal received from the transceiver, the previous CSI, the first coefficient and the second coefficient, and track the communication channel based on the determined CSI.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
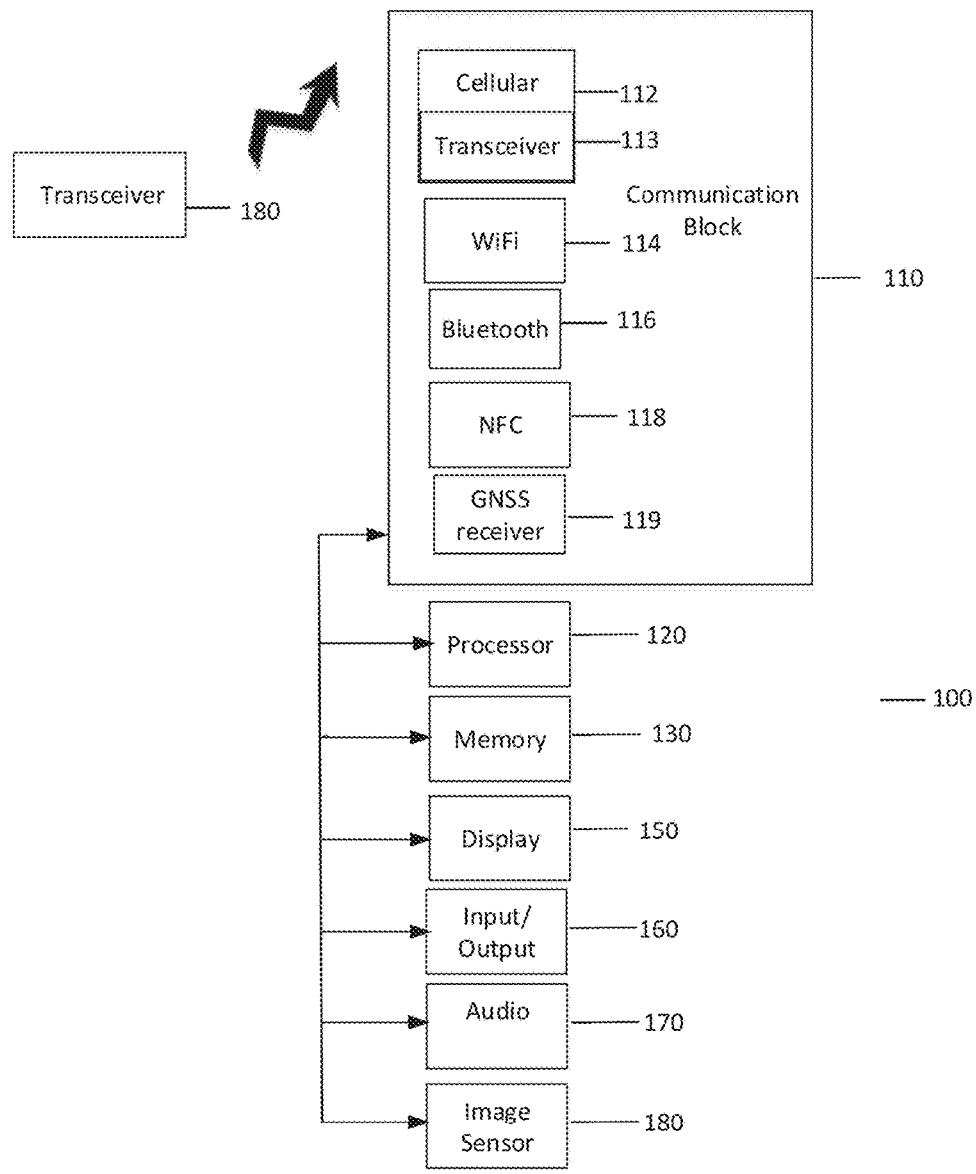
FIG. 1 is a block diagram of an electronic device in a communication network, according to an embodiment of the present disclosure.

FIG. 1 is a block diagram of an electronic device in a network environment, according to an embodiment of the present disclosure.

Referring to FIG. 1, an electronic device 100 includes, but is not limited to, a communication block 110, a processor 120, a memory 130, a display 150, an input/output block 160, an audio block 170 and a wireless transceiver 180. The wireless transceiver 180 may be included in a WiFi access point or cellular base station and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT) and short range communications. The functions of the communication block 110, or a portion thereof including a transceiver 113, may be implemented by a chipset. In particular, the cellular communications block 112 provides a wide area network connection through terrestrial base transceiver stations or directly to other electronic devices, using technologies such as second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). The cellular communications block 112 includes, but is not limited to, a chipset and the transceiver 113. The transceiver 113 includes, but is not limited to, a transmitter and a receiver. The wireless fidelity (WiFi) communications block 114 provides a local area network connection through network access points using technologies such as IEEE 802.11. The Bluetooth communications block 116 provides personal area direct and networked communications using technologies such as IEEE 802.15. The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a WiFi access point or a terrestrial base transceiver station (BTS) (such as a cellular base station) and include a radio frequency transmitter and receiver conforming to third generation partnership project (3GPP) standards. The wireless transceiver 180 may provide data and voice communications services to users of mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or WiFi block 114. The WiFi block 114 may also have a local processor or a chipset which dedicates computing resources to WiFi block 114 and other functional blocks such as CSI estimation blocks.

The memory 130 provides storage for device control program code, user data storage, application code and data storage. The memory 130 may provide data storage for the firmware, libraries, databases, lookup tables, algorithms, methods, channel estimation parameters, and calibration data required by the cellular communications block 112 or WiFi block 114. The program code and databases required by the cellular communications block 112 or WiFi block 114 may be loaded into local storage from the memory 130 upon device boot up. The cellular communications block 112 or WiFi block 114 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100.

The wireless transceiver 180 may be included in an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be an access point, a cell tower, a wireless router, an antenna, multiple antennas, or a combination thereof being used to send signals to, or receive signals from, the electronic device 100, such as a smartphone. The wireless transceiver 180 may relay the wireless signals through the network to enable communication with other electronic devices 100 such as user equipment (UE), servers or a combination thereof. The wireless transceiver 180 may be used to transmit the communication signals, such as voice or data.

A wireless communication system may be modeled as shown in Equation (1):

$$y_l = h_l s_l + n_l \quad (1)$$

where l is a symbol index, $y_l$ is a received complex signal, $h_l$ is a complex Gaussian channel, $s_l$ is a complex transmitted data symbol, and $n_l$ is a complex Gaussian noise sample. CSI may be used in symbol detection by assisting in compensating for the effects of the wireless channel. The accuracy of the CSI may significantly affect the performance of the wireless receiver.

Figure 2:
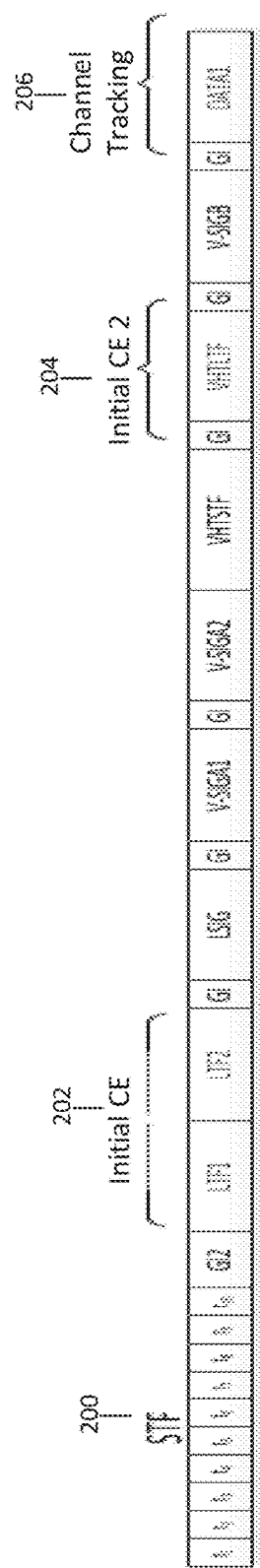
FIG. 2 illustrates fields in a frame used for channel estimation and channel tracking, according to an embodiment of the present disclosure.

FIG. 2 illustrates fields in a frame used for channel estimation and channel tracking, according to an embodiment of the present disclosure.

Referring to FIG. 2, a frame consists of multiple fields containing both control information and data. The frame of FIG. 2 includes a short training field (STF) 200, an initial channel estimation (CE) field 202, a second initial CE 2 field 204 and channel tracking fields 206. However, the frame may have additional training fields, another type of training field and tracking fields without deviating from the scope of the present disclosure. The STF 200 may be used for channel estimation in legacy devices supporting protocols such as IEEE 802.11a/g. The initial CE field 202 includes long training field (LTF) 1 and LTF 2 and may be used to perform channel estimation in devices supporting high data rates. The second initial CE 2 field 204 includes a very high throughput long training field (VHTLTF) and may be used to perform channel estimation in devices supporting very high throughput data rates such as those supporting protocols such as IEEE 802.11ac. The second initial CE 2 field 204 may also be a high throughput long training field (HTLTF) and may be used to perform channel estimation in devices supporting high throughput data rates such as those supporting protocols such as IEEE 802.11n or other protocols without deviating from the scope of the present disclosure. The channel tracking field 206 includes data which may be used to iteratively update the CSI which is initially determined using initial CE field 202 and initial CE 2 field 204. The CSI may be updated as additional data fields are subsequently received.

A typical channel tracking method in a wireless receiver uses a symbol detection and demapping output to recover the transmitted symbol and then uses the recovered symbol as a known training field to update the channel estimation and determine a new CSI. The new CSI is determined using the previous channel estimation result, a received signal and a set of updating coefficients.

According to an embodiment of the present disclosure, the present system and method improves channel tracking accuracy by applying a linear minimum mean square error (LMMSE) method that produces a symbol detection output, such as a logarithm likelihood ratio (LLR) and determines the CSI updating coefficients according to the LMMSE estimation in an iterative fashion. The updated coefficients are used to update the CSI.

The CSI is important information used in the symbol detection and demodulation process. Channel tracking may be used to continuously refine the CSI as data symbols are received and demodulated by the receiver. The present system and method updates the CSI using the linear function shown in Equation (2):

$$\hat{h}_l = \alpha \hat{h}_{l-1} + \beta y \quad (2)$$

where $\alpha$ and $\beta$ are derived from the symbol detection output (the log-likelihood ratio (LLR)) for the l−1th (previously detected) symbol, channel estimation for the l−1th symbol, and the received signal of the lth symbol. A further detailed description of $\alpha$ and $\beta$ is provided below.

According to an embodiment of the present disclosure, the present system and method uses symbol detection LLR to determine the soft symbol distribution, and uses the soft symbol distribution to derive the updating coefficients, $\alpha$ and $\beta$. Using the present system and method, a non time-varying channel may be assumed and for a received signal y, the symbol detection result is independent of the channel h.

According to an embodiment of the present disclosure, the updating coefficients of Equation (2) may be defined as shown in Equations (3) and (4):

$$\alpha = \frac{1}{\gamma_{l-1}} \sum_i p_i \left( \frac{\Omega_{l-1}}{\Omega_{l-1} + \Omega[i] + 1} \right) \quad (3)$$

-continued $$\beta = \sum_i \frac{p_i}{s_i}\left(\frac{\Omega[i]}{\Omega_{l-1}+\Omega[i]+1}\right) \qquad (4)$$

where $\Omega[i]$ is a signal-to-noise ratio (SNR) in the current channel estimation, $(\sigma_h^2/\sigma_n^2)|s_i|^2$ and $\Omega_{l-1}$ is an SNR in the prior channel estimation, $(\sigma_h^2/\sigma_{l-1}^2)\gamma_{l-1}^2$ Using the symbol detection output, the present system and method derives the LMMSE estimation of the channel, with the assumption that the detected symbol $s_l$ is independent from the current channel h, given y and the previous channel estimation $\hat{h}_{l-1}$.

Figure 3:
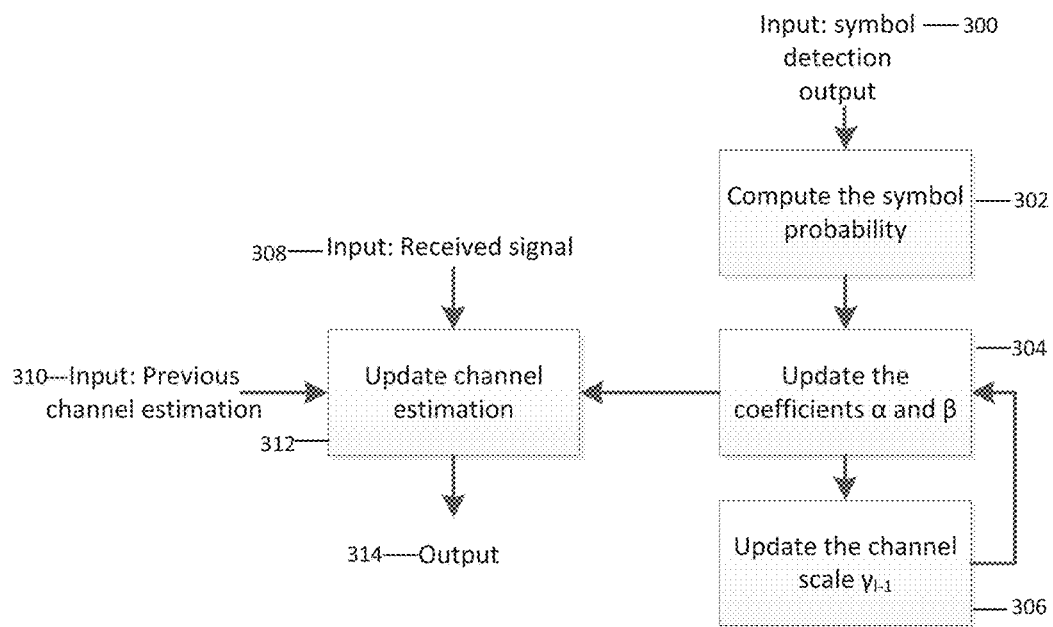
FIG. 3 illustrates an exemplary flowchart of a method for soft channel tracking using a symbol detection output, according to an embodiment of the present disclosure.

FIG. 3 illustrates an exemplary flowchart of a method for soft channel tracking using a symbol detection output, according to an embodiment of the present disclosure.

Referring to FIG. 3, an LLR symbol detection output 300 from a previously detected symbol is provided as an input to determine the symbol probability at 302. The symbol probability is determined using Equation (11) below. At 304, the coefficients α and β are updated directly from the symbol probability according to Equations (3) and (4) respectively. At 306, the channel scale $\gamma_l$ is updated according to Equation (15) below and the scaled channel result is fed back to update the coefficients α and β at 304 in next iteration. At 312, the channel estimation is updated according to Equation (2) above using inputs from the received signal 308, the previous channel estimation 310, and the coefficients α and β updated at 304. The updated channel estimation is provided as output 314.

According to another embodiment of the present disclosure, the updating coefficients α and β may also be defined as shown in Equations (5) and (6):

$$\alpha = \frac{\Omega_{l-1}}{\gamma_{l-1}[1+\Omega+\Omega_{l-1}]} \qquad (5)$$

$$\beta = \frac{\Omega}{\mu(1+\Omega+\Omega_{l-1})} \qquad (6)$$

where $\mu = E[s|y\hat{h}_{l-1}]$ is the soft symbol, and $\Omega_{l-1}$ is the SNR in the previous channel estimation and $\Omega$ is the SNR in the current channel estimation which are defined in Equations (7) and (8) respectively:

$$\Omega_{l-1} = |\gamma_{l-1}|^2 \sigma_h^2/\sigma_{l-1}^2 \qquad (7)$$

$$\Omega = \frac{|\mu|^2}{\sigma_s^2 + \sigma_n^2/\sigma_h^2} \qquad (8)$$

Figure 4:
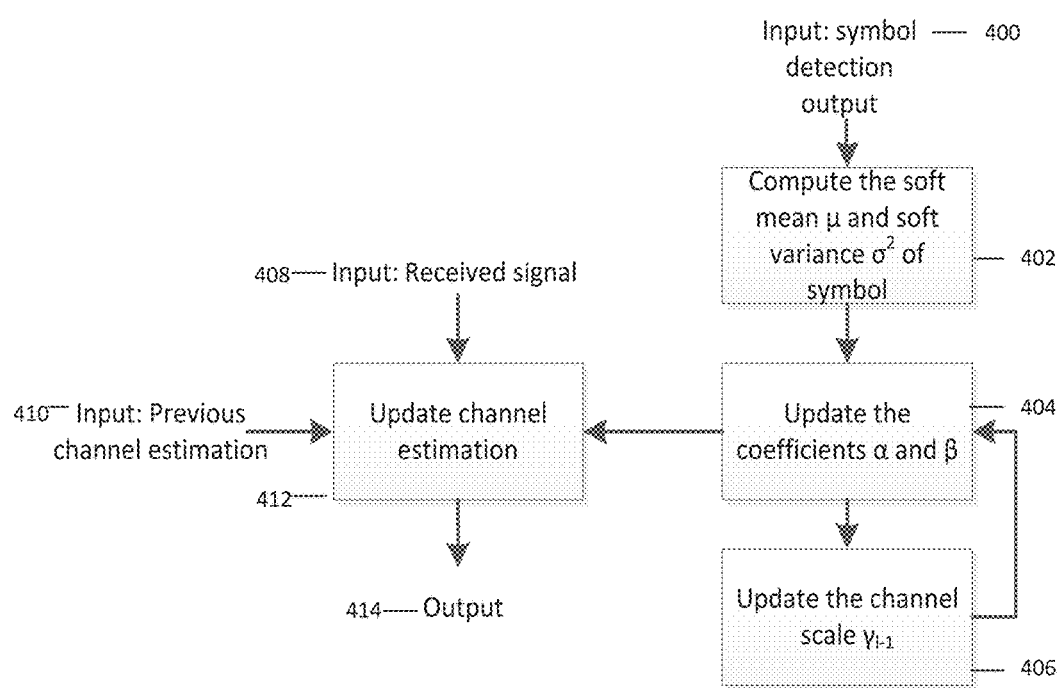
FIG. 4 illustrates an exemplary flowchart of a method for soft channel tracking using a symbol detection output, according to another embodiment of the present disclosure.

FIG. 4 illustrates an exemplary flowchart of a method for soft channel tracking using a symbol detection output, according to another embodiment of the present disclosure.

Referring to FIG. 4, an LLR symbol detection output 400 from a previously detected symbol is provided as an input to determine a soft mean μ and a soft variance $\sigma_s^2$ at 402. The soft mean μ and a soft variance $\sigma_s^2$ are defined by Equations (9) and (10), in which $p_i$ is determined using Equation (11). Alternative methods for determining a soft mean μ and a soft variance $\sigma_s^2$ may be used for various modulation formats without deviating from the scope of the present disclosure.

$$\mu = \sum_i s_i p_i \qquad (9)$$

$$\sigma_s^2 = E[|s-\mu|^2] = \sum_i (s_i-\mu)^2 p_i \qquad (10)$$

The symbol probability for the symbol $s_i$ is determined according to Equation (11):

$$p_i \approx \prod_m \left[b_{m,i}\frac{e^{L_m}}{1+e^{L_m}}+(1-b_{m,i})\frac{1}{1+e^{L_m}}\right] \qquad (11)$$

where $L_m$ is the LLR of the previously detected symbol, and $b_{m,i}$ is the mth bit of symbol $s_i$, which takes value from $\{0,1\}$.

At 404, the coefficients α and β are updated according to Equations (5) and (6) respectively. At 406, the channel scale $\gamma_{l-1}$ is updated according to Equation (15) and the updated channel scale $\gamma_{l-1}$ is fed back to 404 to update the coefficients α and β. At 412, the channel estimation is updated according to Equation (2) above using inputs from the received signal 408, the previous channel estimation 410, and the coefficients α and β updated at 404. The updated channel estimation is provided as output 414.

The method described in the flowchart of FIG. 4 is performed for each symbol, with the initial conditions defined in Equations (12), (13) and (14):

$$\Omega_0 = 0 \qquad (12)$$

$$\gamma_0 = \frac{\Omega}{Q(\Omega+1)} = 1 \qquad (13)$$

$$\sigma_0^2 = \frac{\Omega^2 \sigma^2}{Q^2(\Omega+1)^2} = \sigma^2 \qquad (14)$$

In the methods described in the flowcharts of FIGS. 3 and 4, at each iteration of updating the channel estimation, the channel scale $\gamma_{l-1}$ is updated as described by Equation (15):

$$\gamma_l = \frac{\Omega_{l-1}}{1+\Omega+\Omega_{l-1}} + \frac{\Omega}{(1+\Omega+\Omega_{l-1})}\frac{(|\mu|^2+\sigma_s^2)}{|\mu|^2} \qquad (15)$$

where $\Omega = \Omega[i]$ for the channel scale updated at 306 and 406.

In Equation (15) above, the term, $$\frac{(|\mu|^2+\sigma_s^2)}{|\mu|^2}$$

is introduced to improve the performance and simplify the present method by reducing the bias in computing $\gamma_l$, on the assumption that channel estimation and data detection are independent. However, the term, $$\frac{(|\mu|^2+\sigma_s^2)}{|\mu|^2}$$

may be replaced by a tunable scalar greater than 1 in an alternative embodiment without departing from the scope of the present disclosure. The variance of the channel estimation error may be updated as described by Equation (16):

$$\sigma_l^2 = \alpha^2 \sigma_{l-1}^2 + \beta^2(\sigma_n^2 + \sigma_s^2 \sigma_h^2) \quad (16)$$

The method described in the flowchart of FIG. 4 may also be used when the channel varies over time. When the channel varies over time, a channel scaler may be added to increase the portion of y while updating the CSI due to the varying channel according to Equation (17):

$$h_l = \rho h_{l-1} + \delta_{l-1} \quad (17)$$

where $h_l$ is the CSI of the lth symbol, and $E|h_l|^2 = E|h_{l-1}|^2 = \sigma_h^2$, and $\delta_{l-1}$ is the channel variation over time, with $E[\delta_{l-1}] = 0$, and $E|\delta_{l-1}|^2 = 1 - \rho^2$.

When the channel varies over time, the coefficients determined at 404 of FIG. 4, may be expressed as shown in Equations (18) and (19):

$$\alpha = \frac{\rho \Omega_{l-1}}{\gamma_{l-1}[1 + \Omega + \Omega_{l-1} + (1 - \rho^2)\Omega\Omega_{l-1}]} \quad (18)$$

$$\beta = \frac{\Omega + (1 - \rho^2)\Omega\Omega_{l-1}}{\mu(1 + \Omega + \Omega_{l-1} + (1 - \rho^2)\Omega\Omega_{l-1})} \quad (19)$$

The present system and method may update the estimation bias $\gamma_{l-1}$ as shown in Equation (20) and the estimation error variance $\sigma_l^2$ as shown in Equation (21):

$$\gamma_l = \frac{\rho^2 \Omega_{l-1}}{1 + \Omega + \Omega_{l-1} + (1 - \rho^2)\Omega\Omega_{l-1}} + \quad (20)$$
$$\frac{\Omega + (1 - \rho^2)\Omega\Omega_{l-1}}{(1 + \Omega + \Omega_{l-1} + (1 - \rho^2)\Omega\Omega_{l-1})} \frac{(|\mu|^2 + \sigma_s^2)}{|\mu|^2}$$

$$\sigma_l^2 = \alpha^2(\gamma_{l-1}^2(1 - \rho^2)\sigma_h^2 + \sigma_{l-1}^2) + \beta^2(\sigma_n^2 + \sigma_s^2 \sigma_h^2) \quad (21)$$

where $\Omega$ and $\Omega_{l-1}$ are defined in Equations (7) and (8) respectively.

Figure 5:
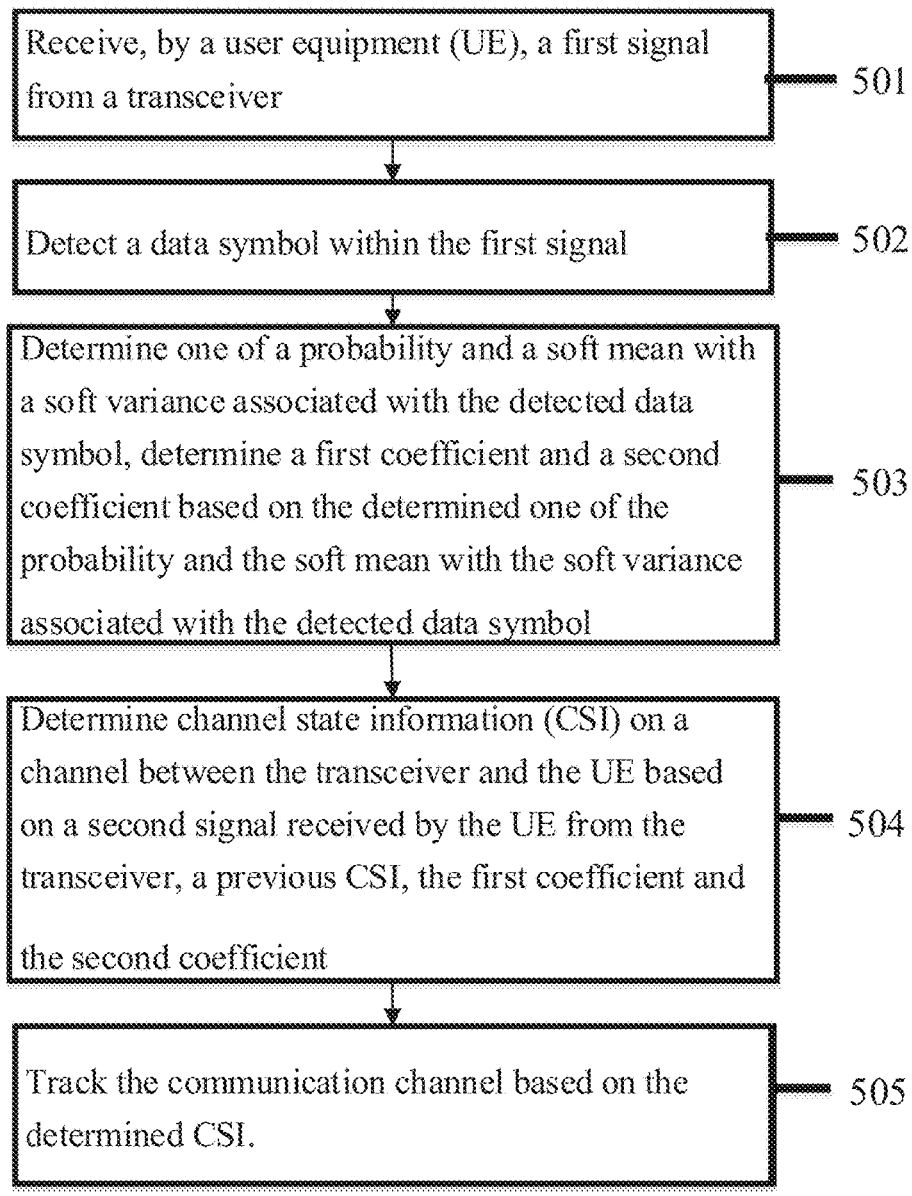
FIG. 5 is a flowchart of a method of determining CSI using a symbol detection output, according to an embodiment of the present disclosure.

FIG. 5 is a flowchart of a method of determining CSI using a symbol detection output, according to an embodiment of the present disclosure Referring to the flowchart of FIG. 5, the present method, at 501, receives, by a user equipment (UE), a first signal from a transceiver. At 502, the method detects a data symbol within the first signal. At 503, the method determines one of a probability and a soft mean with a soft variance associated with the detected data symbol, and determines a first coefficient and a second coefficient based on the determined one of the probability and the soft mean with the soft variance associated with the detected data symbol. At 504, the method determines channel state information (CSI) on a channel between the transceiver and the UE based on a second signal received by the UE from the transceiver, a previous CSI, the first coefficient and the second coefficient. At 505, the method tracks the communication channel based on the determined CSI.

Figure 6:
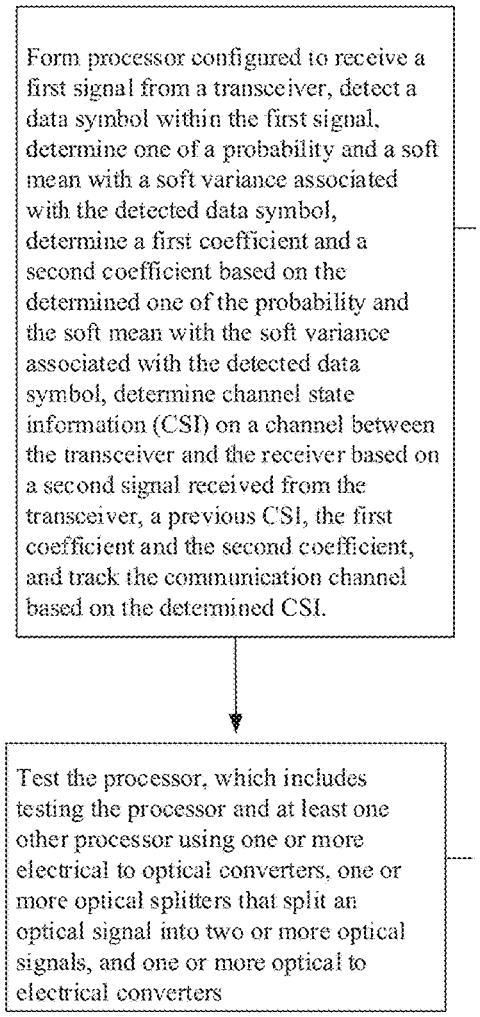
FIG. 6 is a flowchart of a method of testing a processor configured to determine CSI using a symbol detection output, according to an embodiment of the present disclosure.

FIG. 6 is a flowchart of a method of testing a processor configured to determine CSI using a symbol detection output, according to an embodiment of the present disclosure, where the processor is either implemented in hardware or implemented in hardware that is programmed with software.

Referring to FIG. 6, the method, at 601, forms the processor as part of a wafer or package that includes at least one other processor. The processor is configured to receive a first signal from a transceiver, detect a data symbol within the first signal, determine one of a probability and a soft mean with a soft variance associated with the detected data symbol, determine a first coefficient and a second coefficient based on the determined one of the probability and the soft mean with the soft variance associated with the detected data symbol, determine channel state information (CSI) on a channel between the transceiver and a receiver based on a second signal received from the transceiver, a previous CSI, the first coefficient and the second coefficient, and track the communication channel based on the determined CSI.

At 603, the method tests the processor, which includes testing the processor and at least one other processor using one or more electrical to optical converters, one or more optical splitters that split an optical signal into two or more optical signals, and one or more optical to electrical converters.

Figure 7:
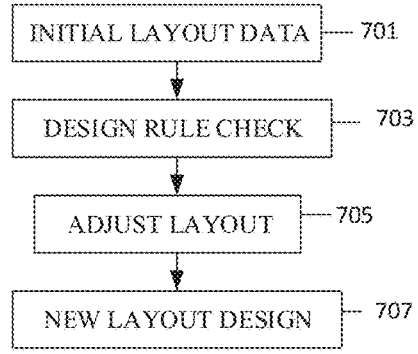
FIG. 7 is a flowchart of a method of manufacturing a processor configured to determine CSI using a symbol detection output, according to an embodiment of the present disclosure.

FIG. 7 is a flowchart of a method of manufacturing a processor configured to determine CSI using a symbol detection output, according to an embodiment of the present disclosure. Referring to FIG. 7, the method, at 701, includes an initial layout of data in which the method generates a mask layout for a set of features for a layer of an integrated circuit. The mask layout includes standard cell library macros for one or more circuit features that include a processor. The processor is configured to receive a first signal from a transceiver, detect a data symbol within the first signal, determine one of a probability and a soft mean with a soft variance associated with the detected data symbol, determine a first coefficient and a second coefficient based on the determined one of the probability and the soft mean with the soft variance associated with the detected data symbol, determine channel state information (CSI) on a channel between the transceiver and a receiver based on a second signal received from the transceiver, a previous CSI, the first coefficient and the second coefficient, and track the communication channel based on the determined CSI.

At 703, there is a design rule check in which the method disregards relative positions of the macros for compliance to layout design rules during the generation of the mask layout.

At 705, there is an adjustment of the layout in which the method checks the relative positions of the macros for compliance to layout design rules after generating the mask layout.

At 707, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
    receiving, by a user equipment (UE), a first signal from a transceiver, the first signal including a logarithm likelihood ratio (LLR) symbol detection output from a previously detected symbol;
    detecting the LLR symbol detection output using a linear minimum mean square error (LMMSE) method;

determining a symbol probability based on the LLR symbol detection output;

determining a soft mean and a soft variance based on the LLR symbol detection output;

determining a first coefficient and a second coefficient based on the determined symbol probability, the soft mean, the soft variance, a signal to noise ratio (SNR) of the first signal and an SNR of a second signal received by the UE from the transceiver;

determining channel state information (CSI) on a channel between the transceiver and the UE based on the second signal received by the UE from the transceiver, a previous CSI, the first coefficient and the second coefficient; and tracking the communication channel based on the determined CSI.

2. The method of claim 1, wherein the first coefficient and the second coefficient are determined based on a channel scaler.

3. The method of claim 1, wherein the first signal is at least one of a long training field, a high throughput long training field, a very high throughput long training field and another type of training field.

4. The method of claim 1, wherein the second signal is a data field of a WiFi signal.

5. The method of claim 1, wherein tracking the communication channel comprises updating the determined CSI when the communication channel changes.

6. The method of claim 5, wherein recently updated values of CSI are provided a higher weighting when updating the determined CSI when the communication channel changes.

7. An apparatus, comprising:
a memory;
a processor; and
a receiver configured to:
receive a first signal from a transceiver, the first signal including a logarithm likelihood ratio (LLR) symbol detection output from a previously detected symbol, detect the LLR symbol detection output using a linear minimum mean square error (LMMSE) method;

determine a symbol probability based on the LLR symbol detection output, determine a soft mean and a soft variance based on the LLR symbol detection output, determine a first coefficient and a second coefficient based on the determined symbol probability, the soft mean, the soft variance, a signal to noise ratio (SNR) of the first signal and an SNR of a second signal received by the UE from the transceiver, determine channel state information (CSI) on a channel between the transceiver and the receiver based on the second signal received from the transceiver, a previous CSI, the first coefficient and the second coefficient, and track the communication channel based on the determined CSI.

8. The apparatus of claim 7, wherein the first coefficient and the second coefficient are determined based on a channel scaler.

9. The apparatus of claim 7, wherein the first signal is at least one of a short training field, a long training field, a high throughput long training field, a very high throughput long training field and another type of training field.

10. The apparatus of claim 7, wherein the second signal is a data field of a WiFi signal.

11. The apparatus of claim 7, wherein tracking the communication channel comprises updating the determined CSI when the communication channel changes.

12. The apparatus of claim 11, wherein recently updated values of CSI are provided a higher weighting when updating the determined CSI when the communication channel changes.

* * * * *